United States Patent
Lundgren

(10) Patent No.: US 8,905,001 B2
(45) Date of Patent: Dec. 9, 2014

(54) FUEL-PUMPING SYSTEM, METHOD FOR OPERATING A FUEL-PUMPING SYSTEM AND FUEL-INJECTION SYSTEM COMPRISING A FUEL-PUMPING SYSTEM

(71) Applicant: Volvo Technology Corporation, Göteborg (SE)

(72) Inventor: Staffan Lundgren, Hindås (SE)

(73) Assignee: Volvo Technology Corporation, Göteborg (SE)

( * ) Notice: Subject to any disclaimer, the term of this patent is extended or adjusted under 35 U.S.C. 154(b) by 0 days.

(21) Appl. No.: 13/964,291

(22) Filed: Aug. 12, 2013

(65) Prior Publication Data

US 2013/0327298 A1 Dec. 12, 2013

Related U.S. Application Data

(63) Continuation of application No. 12/747,906, filed as application No. PCT/SE2007/001150 on Dec. 20, 2007, now abandoned.

(51) Int. Cl.

| | | |
|---|---|---|
| *F02M 69/46* | (2006.01) | |
| *F02D 19/06* | (2006.01) | |
| *F02M 69/50* | (2006.01) | |
| *F02M 37/00* | (2006.01) | |
| *F04B 43/06* | (2006.01) | |
| *F02M 59/14* | (2006.01) | |
| *F02M 63/02* | (2006.01) | |

(52) U.S. Cl.
CPC ........... *F02M 69/50* (2013.01); *F02D 19/0665* (2013.01); *F02D 19/0647* (2013.01); *F02D 19/0684* (2013.01); *F02M 37/0052* (2013.01); *F04B 43/06* (2013.01); *F02M 37/0064* (2013.01); *Y02T 10/36* (2013.01); *F02D 19/0681* (2013.01); *F02M 37/0088* (2013.01); *F02M 59/14* (2013.01); *F02M 63/0225* (2013.01); *F02D 19/0605* (2013.01)
USPC ........................... 123/447; 123/456; 123/457

(58) Field of Classification Search
CPC .... F02D 19/0671; F02M 47/02; F02M 69/50; F02M 37/0041; F02M 37/046
USPC ......... 123/446, 447, 456, 457, 510, 511, 543, 123/557, 540, 541
See application file for complete search history.

(56) References Cited

U.S. PATENT DOCUMENTS

| | | | | |
|---|---|---|---|---|
| 3,978,839 A | * | 9/1976 | DuBois et al. | ........... 123/179.11 |
| 4,068,641 A | * | 1/1978 | Johnson | ........................ 123/450 |
| 4,194,483 A | * | 3/1980 | McChesney et al. | ...... 123/179.9 |

(Continued)

FOREIGN PATENT DOCUMENTS

GB 2 392 957 A * 3/2004 ............. F02M 37/04

*Primary Examiner* — Hai Huynh
(74) *Attorney, Agent, or Firm* — WRB-IP LLP

(57) ABSTRACT

A fuel-pumping system for a fuel includes at least one reservoir providing a first volume for the fuel and a second volume for a compression fluid, a separator membrane between the first volume and the second volume, an inlet port of the at least one reservoir for feeding the fuel to the first volume, an outlet port of the at least one reservoir for discharging the fuel at a high pressure from the first volume, a fluid port of the at least one reservoir for supplying or removing the compression fluid to or from the second volume. An operating method and a fuel-injection system are also disclosed.

30 Claims, 2 Drawing Sheets

(56) References Cited

U.S. PATENT DOCUMENTS

| | | | |
|---|---|---|---|
| 4,325,340 A * | 4/1982 | O'Neill | 123/447 |
| 4,375,206 A * | 3/1983 | Baltz et al. | 123/179.11 |
| 5,368,451 A * | 11/1994 | Hammond | 417/395 |
| 6,672,289 B2 * | 1/2004 | Gau | 123/514 |
| 6,786,205 B2 * | 9/2004 | Stuhldreher et al. | 123/495 |
| 6,955,156 B2 * | 10/2005 | Noda et al. | 123/364 |
| 7,216,634 B2 * | 5/2007 | Hayasaka et al. | 123/514 |
| 7,287,517 B2 * | 10/2007 | Nozaki et al. | 123/514 |
| 7,293,551 B2 * | 11/2007 | Nozaki et al. | 123/514 |
| 7,318,423 B2 * | 1/2008 | Nozaki et al. | 123/516 |
| 7,451,742 B2 * | 11/2008 | Gibson et al. | 123/446 |
| 8,336,527 B2 * | 12/2012 | Aso et al. | 123/519 |
| 2004/0250795 A1 * | 12/2004 | Stroia et al. | 123/447 |
| 2008/0308072 A1 * | 12/2008 | Banerjee et al. | 123/518 |

* cited by examiner

FUEL-PUMPING SYSTEM, METHOD FOR OPERATING A FUEL-PUMPING SYSTEM AND FUEL-INJECTION SYSTEM COMPRISING A FUEL-PUMPING SYSTEM

The present application is a continuation of U.S. application Ser. No. 12/747,906, filed Jun. 20, 2010, which was the U.S. national stage of International Application PCT/SE2007/001150, filed Dec. 20, 2007, both of which are incorporated by reference.

The invention relates to a fuel-pumping system, a method for operating a fuel-pumping system and a fuel injection system comprising a fuel-pumping system.

Dimethyl ether, also known as DME, is a clean-burning alternative to diesel fuel. It can be made from natural gas, coal or biomass. In modern vehicles, common rail systems are used for better performance of the combustion engine. In such common-rail systems, fuel is compressed to high pressures by common-rail pumps and supplied to the engine. However, pumping of DME is difficult, as it has a low viscosity resulting in high internal leakage, and the lubrication properties of liquid DME are very poor. Therefore, pump failures is one of the major obstacles for a commercial engine application.

There is also a need to increase the injection pressure to around 1000 bar in order to improve the cycle efficiency by e.g. improved ignition timing and improved combustion efficiency by injection induces turbulence generation. Thus, for making DME available as a clean burning fuel in vehicles, these issues have to be sold.

U.S. Pat. No. 6,742,479 B2 discloses a fuel supply system for an internal combustion engine. The fuel injection system is particularly adapted for a low-viscosity fuel such as DME. The purpose of the system is to avoid damaging the fuel pump by using the pump only in situations when the lubrication of the pump is ensured by monitoring the state of the DME fuel.

It is desirable to provide a fuel-pumping system for a fuel with a high reliability and stability, particularly for a fuel exhibiting poor lubrication properties and/or unfavourably viscosity properties compared to diesel fuel, such as DME. It is also desirable to provide a method for operating such a fuel-pumping system. It is also desirable to provide a fuel-injection system with such a fuel-pumping system.

According to an aspect of the invention, a fuel-pumping system for a fuel is proposed, wherein at least one reservoir is providing a first volume for the fuel and a second volume for a compression fluid, a separator membrane between the first and the second volume, an inlet port for supplying fuel to the first volume, an outlet port for discharging the fuel at a high pressure, and a fluid port for supplying or removing the compression fluid to or from the second volume.

By providing two separate volumes, one for the fuel and one for the compression fluid, a contact between the fuel and the pump can be avoided. The pump, e.g. the pump's piston liner, only contacts the compression fluid. This compression fluid can have lubrication properties and a viscosity which are favourable for the pump. Thus, any fuel can be used independent of its lubrication properties and/or viscosity properties and the like. The fuel can be optimized its intended use, e.g. for combustion purposes. The compression fluid is moving in a closed loop. Thus, the compression fluid can be optimized for the pump and compression action independent of its combustion properties.

The compression fluid and the fuel are separated by a flexible membrane. This membrane can preferably be made of a reinforced rubber, e.g. of a type use to store fuel in rocket missiles. For instance, the membrane can be a diaphragm or a bellow or the like. This membrane will be compressed by the pressure applied to the compression fluid and therefore needs to withstand the maximum pressure admitted for the system. However, in the preferred setup the pressure difference between the fuel and the compression fluid is low, so it is mainly the compression of the membrane which has to be considered and to a lesser extend its expansion or elongation which can stay within reasonable ranges. Thus, stress to the membrane which might limit its durability is avoided.

The invention, according to an aspect thereof, can be used for any fuel but is particularly useful for a fuel exhibiting poor lubrication properties or a low viscosity, or low viscosity and poor lubrication properties compared to diesel fuel. Dimethyl ether (DME) is one example for such a low-viscosity fuel with lubrication properties which are inferior to diesel fuel. DME is also known to have widely variable, pressure and temperature dependent properties which are inconvenient for a use in automotive systems which have to work at temperatures well below and above the freezing point of water. On the other hand, a problem known for fuels of very high viscosity is to pressurise the fuel in a common high pressure pump. This invention may be applied even for such applications, particularly for fuel that needs further heating to lower the viscosity before it enters the injector nozzle. Preferably, the fuel exhibits poorer lubrication properties than diesel fuel and/or a viscosity that is at least 50% higher or lower, preferably at least a factor of 2 higher or lower, than diesel fuel under comparable ambient conditions. For instance, DME is known to have only 10% of the viscosity of diesel fuel. If so called bunker oil is used, the viscosity of bunker oil is very high. Bunker oil is often used as fuel e.g. aboard ships. The viscosity of bunker oil is about a factor of 5 higher than the viscosity of diesel fuel. This type of fluid needs to be preheated so that it can be pumped in a normal pump. Preferably, less heating needs to be applied when used in the pumping system according to an aspect of the invention in the high pressure stage by preferably heating only the fuel that passes an injector to a viscosity acceptable for forming a spray in an injection nozzle when used in a common rail injection system.

The fluid port can be coupled to a compression-fluid pump unit for feeding or removing the compression fluid to or from the reservoir. A standard common rail pump can be used which can deliver high pressures up to 1000 bar or more which are suitable for standard common rail devices in vehicles. The pump is completely decoupled from the fuel and is in contact only with the compression fluid.

Favourably, a damping unit can be arranged in a fluid conduit between the fluid port and the compression-fluid pump unit. This avoids pressure peaks and eliminates stress to the membrane and to the other components of the system.

By arranging a control valve in a fluid conduit between the fluid port and the pump unit, the pump direction of the pump can be switched. Preferably, the control valve can be arranged between the damping unit and the pump unit. Thus, the damping unit can equalize pressure spikes between the pump unit and the reservoir.

Favourably, the fuel outlet port can be coupled to a common rail unit. The common rail unit can deliver the fuel at high pressure e.g. to a combustion engine which consequently can be operated under clean environmental friendly conditions.

A first check valve can be installed in a fluid conduit between the fuel storage tank and the reservoir. Favourably, the reservoir can be refilled with the fuel while the reservoir is at a lower pressure, i.e. no extra compression is applied to the fuel by the compression fuel. The fuel supplied to the reservoir can be pre-pressurized.

A second check valve can be installed in a fluid conduit between the reservoir and the high-pressure device. This favourably enables to feed high-pressure fuel to the high-pressure device without pressure drop in the system. Preferably, the check valve is pressure adjustable so that the valve opens only above a predefined pressure value.

The damping unit can preferably comprise a heat exchanger. The heat exchanger can cool the compression fluid and damp probable pressure spikes or pressure drops during the operation of the fuel-pumping system.

According to a preferred embodiment, at least two reservoirs can be provided, each reservoir having a first volume for a fuel and a second volume for a compression fluid, the first and the second volume being separated by a flexible membrane, an inlet port for the fuel, an outlet port for the fuel at a high pressure and a fluid port for supplying of removing the compression fluid. Favourably, while in one reservoir the desired pressure is built up, the other reservoir can be refilled with fuel after this other reservoir having discharged the fuel to the high-pressure device. Particularly, the compression fluid is pumped from one reservoir to the other for compressing the fuel. When the desired fuel pressure in one reservoir is reached, the first one reservoir can discharge the fuel and compression of the fuel takes place in the other reservoir by supplying compression fluid to this other reservoir.

Favourably, the compression-fluid pump unit is jointly coupled to the reservoirs. The pump can be switched to and from the two more reservoirs. Pressure spikes which can occur during switching can easily be reduced by the damping unit.

Preferably, the fuel storage tank can be jointly coupled to the reservoirs, yielding a compact arrangement of the fuel-pumping device.

When the high-pressure device can be jointly coupled to the reservoirs, the high pressure device can be continuously or at least quasi continuously supplied with high pressure fuel simply by switching the compression cycle from one reservoir to the other. During switching the pump from one reservoir to another, a pressure drop on the high-pressure side of the system can advantageously be prevented by the check valves between the reservoirs and the high-pressure device.

Advantageously, the compression fluid can be a lubricant. The compression-fluid pump can easily handle such media. Probable poor lubrication properties of the fuel do not to contribute to pump wear. Particularly, diesel can be used as the compression fluid.

According to an independent further aspect of the invention, a method for operating a fuel-pumping system is proposed, wherein compressing of a fuel is performed in a first volume, wherein a second volume of a compression fluid contained in a reservoir is increased and the fuel contained in the first volume in the reservoir is compressed by expanding a flexible membrane between the first and second volumes. Preferably, a standard pump such as a common rail pump can be used because the compression-fuel pump is protected from the fuel which might have poor lubrication properties, particularly lubrication properties inferior to diesel fuel ands which has a higher or a lower viscosity compared to diesel fuel. The fuel is reliably separated from the compression fluid and thus from wear-prone parts of the pump.

Advantageously, the compression fluid can be pumped to and from between at least two reservoirs, each reservoir providing a first volume for the fuel and a second volume for the compression fluid. Each reservoir alternately provides fuel at a high pressure.

One of the reservoirs can be refilled with fuel on a low pressure while fuel can be compressed up to a desired pressure in the other reservoir. A continuous or at least quasi-continuous operation of the high pressure device is facilitated.

Favourably, the fuel is compressed up to a pressure of more than 500 bar, preferably up to 1000 bar, or even more, particularly up to 1500 bar, preferably up to 2000 bar, preferably 3000 bar, more preferably up to 4000 bar.

Further, a fuel-injection system comprising a common rail for providing fuel under high-pressure to a combustion engine is proposed, wherein a fuel-pumping device for a fuel is employed, which comprises at least one reservoir providing a first volume for the fuel and a second volume for a compression fluid, a separator membrane between the first and the second volume, an inlet port for the fuel coupled to a fuel storage tank; an outlet port for the fuel coupled to a high-pressure device and a fluid port for supplying or removing the compression fluid.

Preferably at least two reservoirs, particularly exactly two reservoirs, can be provided, each reservoir having a first volume for the fuel and a second volume for a compression fluid, a separator membrane between the first and the second volume, an inlet port for the fuel coupled to a fuel storage tank, an outlet port for the fuel coupled to a high-pressure device and a fluid port for supplying or removing the compression fluid.

In an advantageous embodiment of an aspect of the invention, a compression-fluid pump unit can be jointly coupled to the reservoirs, pumping the compression fluid into one reservoir for compression the fuel in the first volume of the reservoir, while depleting at least one other reservoir from compression fluid.

Favourably, a fuel storage tank can be jointly coupled to the reservoirs, allowing for a compact system set up.

The common rail can be jointly coupled to the reservoirs. By switching the compression of the fuel from one reservoir to the other, a continuous, respectively a quasi continuous, supply of the fuel injection system with pressurized fuel can be achieved. If the pressure can be increased above 500 bar, preferably up to 1000 bar, or even more, particularly up to 1500 bar, preferably up to 2000 bar, preferably 3000 bar, more preferably up to 4000 bar, an improved cycle efficiency by e.g. improved ignition timing and an improved combustion efficiency by injection-induced turbulence generation in a combustion chamber of the engine's cylinders.

When a check valve can be arranged in a fluid conduit between the common rail and the reservoirs, a pressure drop in the common rail can be avoided.

BRIEF DESCRIPTION OF THE DRAWINGS

The present invention together with the above-mentioned and other advantages may best be understood from the following detailed description of the embodiment, but not restricted to the embodiment, wherein is shown schematically.

DETAILED DESCRIPTION

Figure 1:
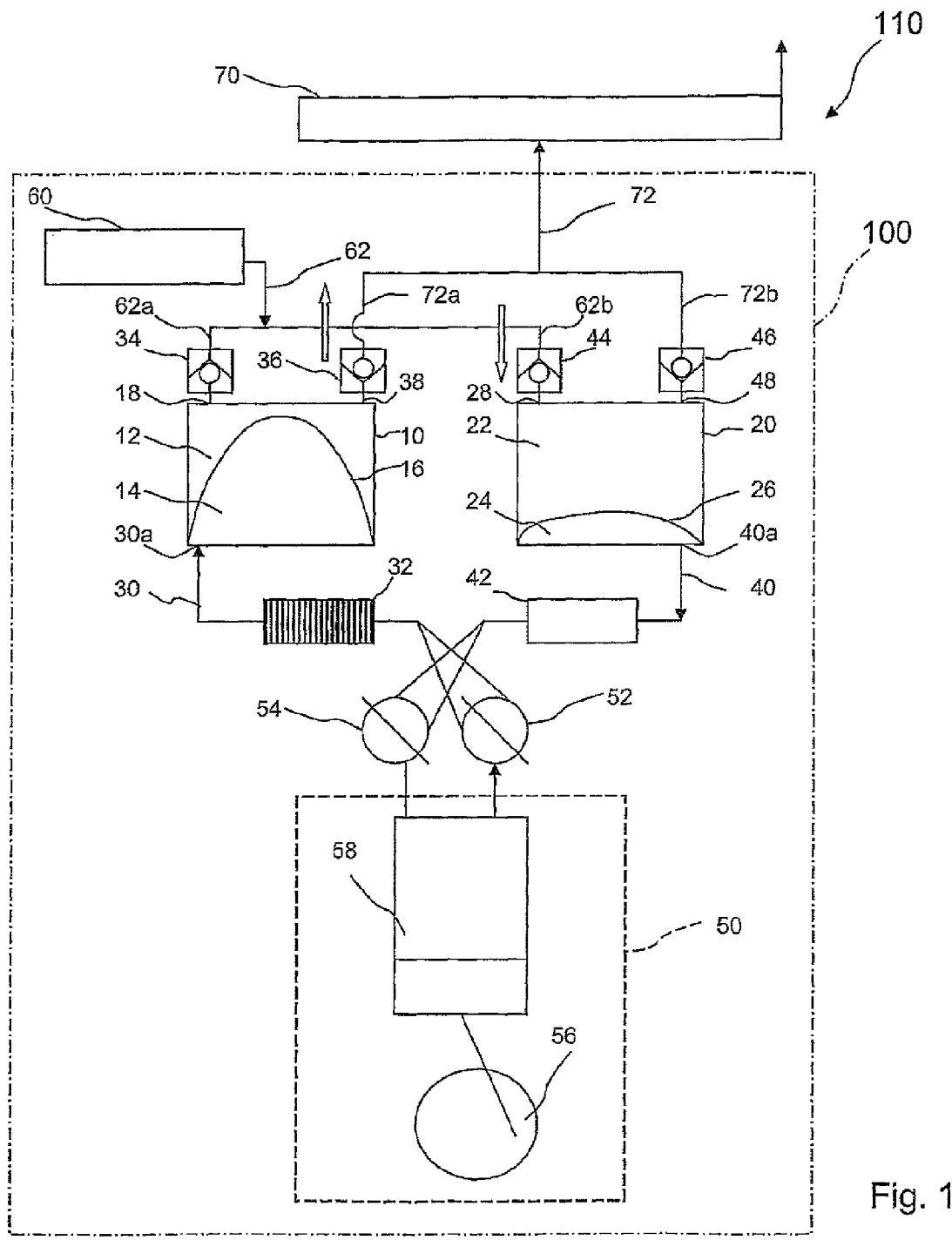
FIG. 1 a preferred fuel-injection system according to an aspect of the invention comprising a preferred fuel-pumping system according to an aspect of the invention in a first preferred operation mode according to an aspect of the invention.

In the drawings, equal or similar elements are referred to by equal reference numerals. The drawings are merely schematic representations, not intended to portray specific parameters of aspects of the invention. Moreover, the drawings are intended to depict only typical embodiments of the invention and therefore should not be considered as limiting the scope of aspects of the invention.

Figure 2:
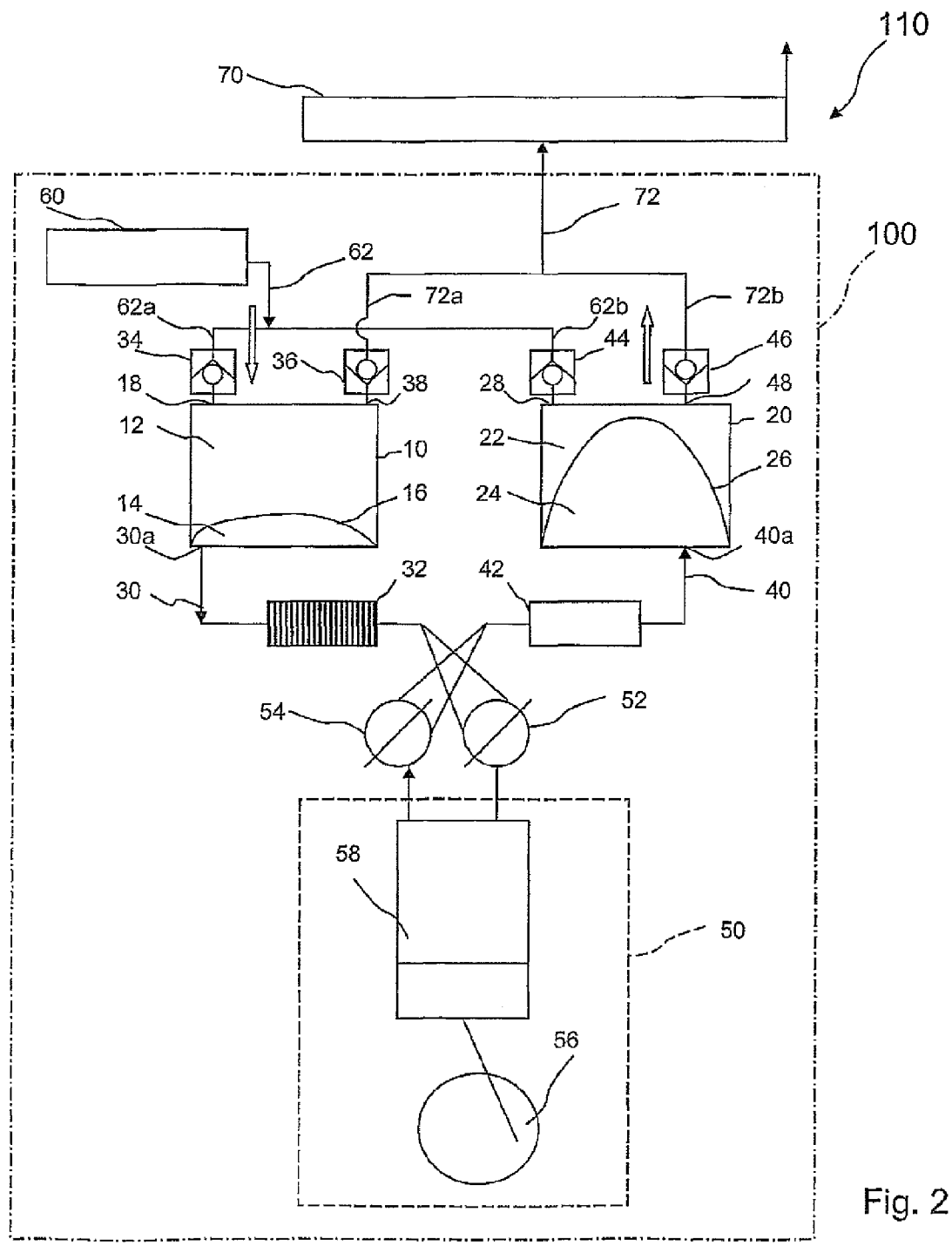
FIG. 2 the preferred fuel-injection system of FIG. 1 with the preferred fuel-pumping system in a second preferred operation mode according to an aspect of the invention.

FIG. 1 and FIG. 2 illustrate a preferred embodiment of the invention and depict schematically a fuel-injection system 110 comprising a preferred fuel-pumping system 100 for fuel, particularly DME. The fuel-injection system 110 may be coupled to a combustion engine (not shown). FIG. 1 shows a first operation mode, where the fuel is compressed to a high pressure in a first reservoir 10 and FIG. 2 shows a second operation mode where fuel is compressed to a high pressure in a second reservoir 20.

By way of example, two reservoirs 10, 20 are supplied with fuel from a fuel storage tank 60 via a fluid conduit 62 which splits in two branches 62a, 62b, one (62a) connected to an inlet port 18 of the first reservoir 10 and the other (62b) connected to an inlet port 28 of the second reservoir 20. The respective fuel outlet port 38 of the first reservoir 10 and the fuel outlet port 48 of the second reservoir 20 are connected to a high-pressure device 70, which in this embodiment is a common rail 70, via fluid conduits 72a, 72b and 72, wherein the two branches 72a, 72b merge into the fluid conduit 72. In each branch 72a, 72b a check valve 36, 46 is installed which is open for a flow direction from the reservoirs 10, 20 to the common rail 70 and closed for the reverse flow direction. Preferably, the valves 36, 46 open above a predefined pressure.

A compression-fluid pump unit 50 is connected to the first reservoir 10 via a first fluid conduit 30 to a fluid port 30a of the first reservoir 10 and to the second reservoir 20 via a fluid conduit 40 to a fluid port 40a of the second reservoir 20. In the first fluid conduit 30 a control valve 52 and—between the compression-fluid pump unit 50 and the first reservoir 10—a damper unit 32 are arranged. The damper 32 is preferably a heat exchanger. Symmetrically to this, a control valve 54 and—between the compression-fluid pump unit 50 and the second reservoir 20—a damper unit 42, preferably a heat exchanger, are arranged in the second fluid conduit 40.

The compression-fluid pump unit 50 comprises an actuator 56 and a compression-fluid reservoir 58, wherein the compression fluid can be pumped either into the first reservoir 10 or the second reservoir 20, depending on the setting of the control valves 52, 54. The control valves 52, 54 can be switched in a way to reverse the pump direction of the compression-fluid pump unit 50 for this purpose. Preferably, the compression-fluid pump unit 50 can be a standard common rail pump. The control valves 52, 54 can be e.g. of encapsulated solenoid valve type, sliding valves or common rail injector types. The compression fluid can be e.g. lubricated diesel fuel or the like.

The reservoirs 10, 20 are preferably set up equally. Reservoir 10 provides a first volume 12 for the fuel and a second volume 14 for a compression fluid, wherein a separator membrane 16 is arranged between the first volume 12 and the second volume 14. Reservoir 20 provides a first volume 14 for the low viscosity-fuel and a second volume 24 for a compression fluid, wherein a separator membrane 26 is arranged between the first volume 22 and the second volume 24.

Each first volume 12, 22 is in fluid connection with the respective fuel inlet port 18, 28 and each second volume 14, 24 is in fluid connection with the respective fuel outlet port 38, 48 of the respective reservoir 10, 20. In the fuel feed conduit 62a, a check valve 34 is arranged which allows to refill fuel from the fuel storage tank 60 at a lower pressure than the discharge pressure at which the fuel is supplied to the common rail 70. The fuel can be pre-pressurized by a pre pump (not shown) or by tank pressure.

The membranes 16, 26 are flexible and separate the first from the second volume 12, 14; 22, 24 of the respective reservoir 10; 20. The membranes 16, 26 can be a diaphragm or a bellow. A suitable material for such a membrane can be reinforced rubber, e.g. reinforced, with aramide fibres (aramide=aromatic polyamide), or the like. The membranes 16, 26 are fixed inside the respective reservoir 10, 20. As soon as the amount of compression fluid in the second volume 14, 24 is increased, the corresponding membrane 16, 26 expands and compresses the fuel in the first volume 12, 22 of the respective reservoir 10; 20.

According, to the first operation mode depicted in FIG. 1, the control valves 52, 54 of the compression-fluid pump unit 50 are switched to a state in which the second volume 14 of the first reservoir 10 is increased and fuel is discharged from the first volume 12 of reservoir 10 via the outlet port 38 and the check valve 36 into the common rail 70. To make this possible, compression fluid is pumped by pump unit 50 into the second volume 14 of the first reservoir 10 while the compression fluid in the second volume 24 of the second reservoir 20 is drained into the pump unit 50. At the same time, fuel is refilled to the first volume 22 of the second reservoir 20 through the check valve 44 and inlet port 28. This means that the compression fluid is pumped from the second reservoir 20 to the first reservoir 10. The respective flow directions of the fuel and of the compression fluid are indicated by arrows in the drawing.

When the second volume 24 of the second reservoir 20 is nearly completely drained, the valves 52, 54 switch to a state which is depicted in FIG. 2 and the pump unit 50 starts to fill the second volume 24 of the second reservoir 20. This timing is set by the fuel volume flow out of the first reservoir 10 to the common rail 70 and change accordingly with the engine operation and the fuel consumption.

A control unit which monitors the amount and volume of the compression fluid in the volumes 14, 24, the fuel pressure, the switching time, etc. is provided but not shown.

Referring now to FIG. 2 the settings of the valves 52, 54 are chosen to fill the second volume 24 of the second reservoir 20 and to drain the second volume 14 of the first reservoir 10. The second volume 24 of the second reservoir 20 increases, compresses the fuel in the first volume 22 of the second reservoir 20 while fuel is refilled in the first volume 12 of the first reservoir 10. Fuel is discharged from the first volume 22 of the second reservoir 20 through the outlet port 48 and the check valve 46 to the common rail 70.

Pressurized fuel, such as liquid DME, is feed to the system 100 by a pre-pump or by tank pressure. A common rail pump as pump unit 50 and a lubricated compression fluid as pump media are used to generate the required high pressure in the first volumes 12, 22 of the reservoirs 10, 20.

The compression fluid is used to build up pressure and is pumped back and forth between the second volumes 14, 24 of the two reservoirs 10, 20 depending on the setting of the valves 52, 54. These valves 52, 54 can be actuated by e.g. solenoids, which can be advantageously arranged outside the high pressure region. Several valve solutions can be used, such as sliding valves or normal common rail injectors. The valve switching time preferably is chosen to be short in order to minimize a pressure drop/buildup during valve actuation. The compression fluid is cooled by heat exchangers which act as damping units 32, 42 of the respective reservoirs 10, 20 and can reduce pressure spikes during valve switching.

The check valves 36, 46 in the fluid conduits 72a, 72b are preferably pressure adjustable and are used to prevent a pressure drop in the common rail 70 during valve switching and to allow the inactive first reservoir 22 to be refilled with fuel.

Compared with typical viscosity values and/or lubrication properties of today's standard fuels like diesel fuel the invention allows for making available a pumping system for a low viscosity fuel such as DME or for fuel with poor lubrication properties (or for fuel with both low viscosity and poor lubrication properties) which otherwise according to the art cannot be handled reasonably by standard components in a common rail system of a combustion engine. Following the teaching of the invention standard components can be used to provide DME at high pressures of far more than 500 bar, preferably up to 1000 bar, or even more, particularly up to 1500 bar, preferably up to 2000 bar, preferably 3000 bar, more preferably up to 4000 bar which allows for an improved operation mode of the combustion engine. The common rail system is not limited by using the low-viscosity DME but can take advantage of the operation conditions for the engine as known in standard common rail systems.

The invention offers a possibility to deliver e.g. DME fuel at high pressure to an injection system without or poor lubrication, by using mainly standard common rail components. These standard components are well proven and tested. Additionally, the employment of such components is less expensive than the development of new dedicated DME-pumps.

The invention claimed is:

1. A fuel-pumping system for a fuel, comprising
at least one reservoir providing a first volume for the fuel and a second volume for a compression fluid, a separator membrane between the first volume and the second volume;
an inlet port of the at least one reservoir for feeding the fuel to the first volume;
an outlet port of the at least one reservoir for discharging the fuel at a high pressure from the first volume;
a fluid port of the at least one reservoir for supplying or removing the compression fluid to or from the second volume,
a compression-fluid pump unit, wherein the fluid port is coupled to the pump unit for supplying or removing the compression fluid to or from the reservoir; and
a damping unit arranged in a fluid conduit between the fluid port and the pump unit,
wherein the fuel comprises dimethyl ether.

2. The fuel-pumping system according to claim 1, wherein a control valve is arranged in a fluid conduit between the fluid port and the pump unit.

3. The fuel-pumping system according to claim 2, wherein the control valve is arranged between the damping unit and the pump unit.

4. The fuel-pumping system according to claim 1, wherein the fuel outlet port is coupled to a high-pressure device.

5. The fuel-pumping system according to claim 1, wherein a first check valve is installed in a fluid conduit between a fuel storage tank and the reservoir.

6. The fuel-pumping system according to claim 1, wherein a second check valve is installed in a fluid conduit between the reservoir and a high-pressure device.

7. The fuel-pumping system according to claim 1, wherein the damping unit comprises a heat exchanger.

8. The fuel-pumping system according to claim 1, wherein at least two reservoirs are provided each reservoir having a first and a second volume separated by a membrane; an inlet port for the fuel; an outlet port for the fuel at a high pressure and a fluid port for supplying or removing the compression fluid to or from the second volume.

9. The fuel-pumping system according to claim 8, wherein the compression-fluid pump unit is jointly coupled to the reservoirs.

10. The fuel-pumping system according to claim 8, wherein the fuel storage tank is jointly coupled to the reservoirs.

11. The fuel-pumping system according to claim 8, wherein the high-pressure device is jointly coupled to the reservoirs.

12. The fuel-pumping system according to claim 1, wherein the fuel exhibits poorer lubrication properties than diesel fuel and/or a viscosity that is at least 50% higher or lower, preferably at least a factor of 2 higher or lower, than diesel fuel under comparable ambient conditions.

13. The fuel-pumping system according to claim 1, wherein the compression fluid comprises a lubricant.

14. The fuel-pumping system according to claim 1, wherein the compression fluid comprises diesel fuel.

15. A fuel-injection system comprising a common rail for providing fuel under high-pressure to a combustion engine, comprising
a fuel-pumping system as set forth in claim 1, wherein the inlet port of the at least one reservoir for the fuel is coupled to a fuel storage tank, the outlet port of the at least one reservoir discharges the fuel at a high pressure to a common rail, and the fluid port of the at least one reservoir is coupled to a compression-fluid pumping unit for supplying or removing the compression fluid to or from the second volume.

16. The fuel-injection system according to claim 15, wherein at least two reservoirs are provided, each reservoir having a first volume and a second volume separated by a membrane, an inlet port for the fuel, an outlet port for the fuel at a high pressure and a fluid port for supplying or removing the compression fluid to or from the second volume.

17. The fuel-injection system according to claim 15, wherein the compression-fluid pump unit is jointly coupled to the reservoirs, pumping the compression fluid into one reservoir for compressing the fuel while draining at least one other reservoir from compression fluid.

18. The fuel-injection system according to claim 15, wherein a fuel storage tank is jointly coupled to the reservoir(s).

19. The fuel-injection system according to claim 15, wherein the common rail is jointly coupled to the reservoir(s).

20. The fuel-injection system according to claim 15, wherein at least one check valve is arranged in a fluid conduit between the common rail and the reservoir(s).

21. The fuel-injection system according to claim 15, wherein the fuel exhibits poorer lubrication properties than diesel fuel and/or a viscosity that is at least 50% higher or lower, preferably at least a factor of 2 higher or lower, than diesel fuel under comparable ambient conditions.

22. The fuel-injection system according to claim 15, wherein the compression fluid exhibits a higher viscosity and/or better lubrication properties than the fuel being compressed by the compression fluid.

23. The fuel-injection system according to claim 15, wherein the compression fluid comprises diesel fuel.

24. A method for operating a fuel-pumping system, comprising
compressing fuel in a first volume, wherein the fuel is dimethyl ether,
increasing a second volume of a compression fluid contained in at least one reservoir,
compressing the fuel contained in the first volume in the reservoir by expanding a flexible membrane between the first and second volumes of the at least one reservoir by supplying compression fluid to the second volume of the at least one reservoir with a compression fluid pump, and damping compression fluid with a damping unit disposed between the compression fluid pump and the second volume.

25. The method according to claim 24, wherein the compression fluid is pumped to and from between at least two reservoirs, each reservoir providing a first volume for the fuel and a second volume for the compression fluid.

26. The method according to claim 25, wherein one of the reservoirs is refilled with fuel on a low pressure while fuel is compressed up to a desired pressure in the other reservoir.

27. The method according to claim 24, wherein the fuel is compressed up to a pressure of more than 500 bar.

28. The method according to claim 24, wherein the fuel exhibits poorer lubrication properties than diesel fuel and/or a viscosity that is at least 50% higher or lower than diesel fuel under comparable ambient conditions.

29. The method according to claim 24, wherein the compression fluid exhibits a higher viscosity and/or better lubrication properties than the fuel being compressed by the compression fluid.

30. The method according to claim 29, wherein the diesel fuel is used as compression fluid in the second volume to compress dimethyl ether in the first and second volume.

* * * * *